(No Model.)
E. D. MIDDLEKAUFF.
CURLING IRON.
No. 580,877. Patented Apr. 20, 1897.
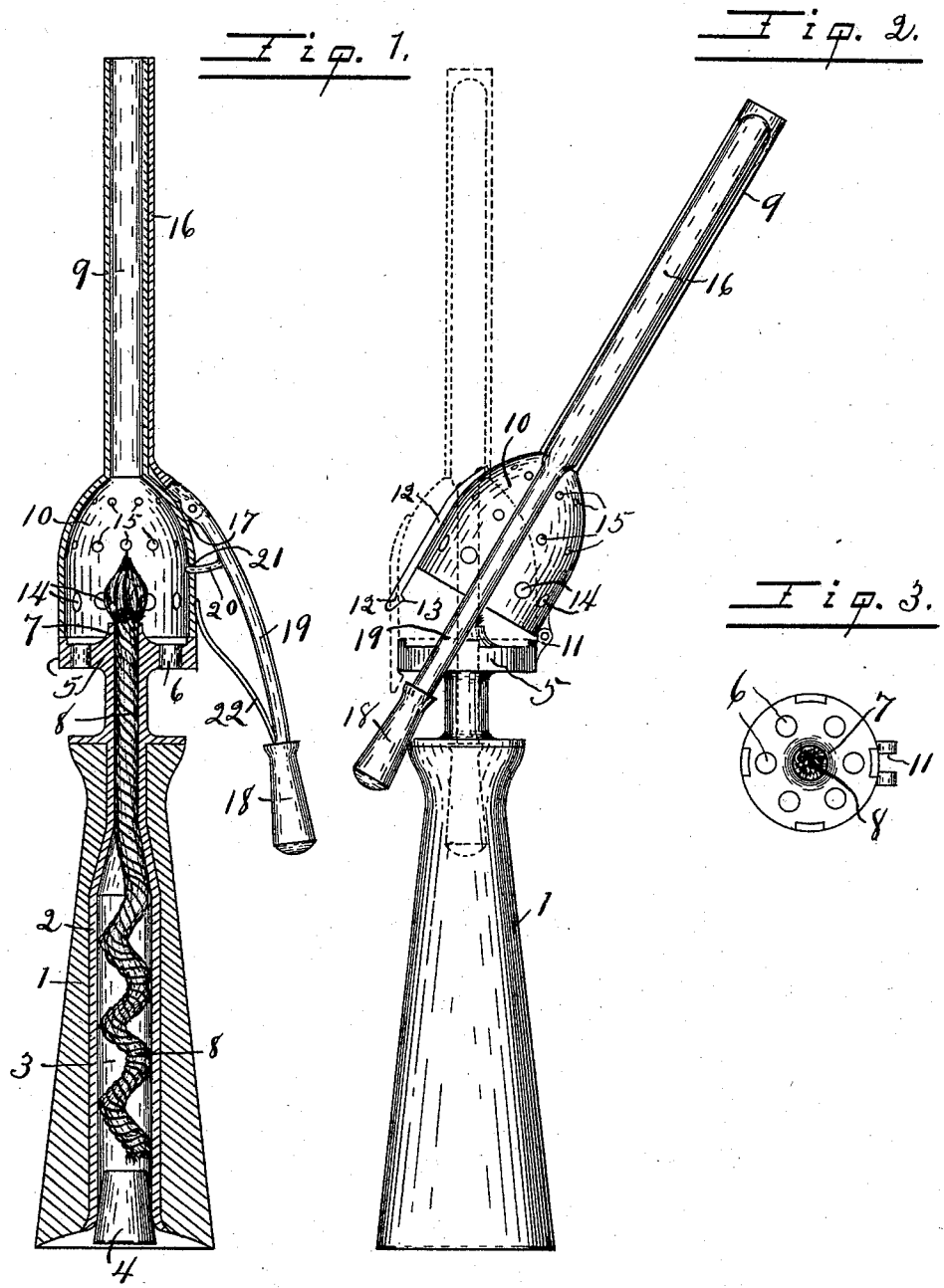

UNITED STATES PATENT OFFICE.

ELLSWORTH D. MIDDLEKAUFF, OF SAN FRANCISCO, CALIFORNIA.

CURLING-IRON.

SPECIFICATION forming part of Letters Patent No. 580,877, dated April 20, 1897.

Application filed August 28, 1896. Serial No. 604,242. (No model.)

*To all whom it may concern:*

Be it known that I, ELLSWORTH D. MIDDLE-KAUFF, a citizen of the United States, residing in the city and county of San Francisco and State of California, have invented certain new and useful Improvements in Self-Heating Curling-Irons; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to certain new and useful improvements in self-heating curling-irons; and my object is to provide a curling-iron which may be heated and such heat maintained while the curling-iron is in use; also, one which may be safely operated while the heat is being maintained.

My invention consists in the peculiar construction, novel combination, and adaptation of parts hereinafter mentioned, and particularly pointed out in the claim hereunto annexed.

Referring to the accompanying drawings, Figure 1 is a sectional view of my improved self-heating curling-iron, through the center of the same. Fig. 2 is a side elevation of the same with the curling-tube unfastened and partly pressed over. Fig. 3 is a top view of the burner.

Similar figures of reference indicate corresponding parts throughout the several views.

1 represents the handle, which is hollow and provided with a cylindrical casing 2, which forms a reservoir 3 for inflammable material, such reservoir 3 being closed at the rear end by means of a cork 4. The casing 2 is continued beyond the top of the handle 1, whereupon a burner-seat 5 is rigidly attached, such burner-seat 5 being provided with openings 6 for the purpose of providing a suitable draft of air and such burner-seat 5 being also provided with a burner 7, which is slightly raised. The reservoir 3 is provided with a small opening in the top end into which a wick 8 is drawn for the purpose of conducting the combustible from the reservoir 3 to the burner 7.

9 represents the curling-tube, which is provided with a bell-shaped base 10, which is attached at one side to the burner-seat 5 by means of a hinge 11, and at the other side such curling-tube 9 is held in position by means of a spring-catch 12, which is rigidly attached at one end to the face of the base 10, and the other end is adapted to engage with the under side of the burner-seat 5 by means of a lug 13.

The bell-shaped base 10 is provided with a series of large holes 14 in the side near the lower edge of the same and smaller holes 15 in the side near the apex of such bell-shaped base 10, such holes 14 15 being for the purpose of creating a draft of air which escapes through the curling-tube 9. A concave clamp 16, which is adapted to fit over one side of the curling-tube 9, is hinged to a lug 17 on the side of the base 10. Such clamp 16 is provided with a handle 18, which is inserted on the end of a stem 19, which projects from the inner end of the clamp 16. Such stem 19 is provided with a guide-pin 20, which is rigidly attached on the under side of the same, and such guide-pin 20 is inserted in a hole 21 for that purpose in the bell-shaped base 10. A suitable spring 22, preferably of flat material, is rigidly attached to the stem 19 near the handle 18 and is adapted to engage with the face of the base 10 for the purpose of maintaining the clamp 16 in contact with the curling-tube 9. The lug 17 is attached to the base 10 at a point midway between the catch 12 and the hinge 11, so as to render the handle 18 convenient for use in operating the curling-tube 9 while lighting the wick 8.

The mode of operating my improved self-heating curling-iron is as follows: The wick 8 having been inserted in position in the reservoir and burner, the cork is removed from reservoir, and such reservoir is filled with suitable combustible material, preferably alcohol. The cork is replaced, and the operator grasps the handle 1 with the left hand, and, with the right hand on the handle 18 of the clamp 17, presses the curling-tube 9 rearwardly, as shown in Fig. 2, the lug 17 of the catch 12 being adapted to disengage the burner-seat 5 when such curling-tube 9 is pressed rearwardly. The wick 8 is then lighted. The curling-tube 9 is then pressed forwardly to its normal position, as shown by dotted lines, Fig. 2, whereupon the flame soon heats the curling-tube 9 and the curling-iron is ready for use, the flame maintaining the curling-tube at the desired temperature while in use. The flame is easily extinguished by blowing through the draft-holes.

The holes 14, 15, and 6 are so arranged and are of such size as to provide a proper draft for the flame at any angle at which the curling-iron may be placed without smothering the flame.

Having described my invention, what I claim is—

The herein-described self-heating curling-iron comprising the curling-tube having the bell-shaped base, and the clamp 16, of concave form adapted to fit over one side of the curling-tube and hinged to lugs on the side of the base and provided with a stem and a handle thereon; the said stem being provided with the guide-pin 20, extending through an aperture in the base and with a spring bearing against said base, substantially as and for the purpose specified.

In testimony whereof I affix my signature in presence of two witnesses.

ELLSWORTH D. MIDDLEKAUFF.

Witnesses:
  MOLBRY HAYNES,
  JOSHUA B. WEBSTER.